July 28, 1970    W. R. KOEHN    3,521,635
FLOWMETER DE-AERATOR FOR PARENTERAL FLUID ADMINISTRATION SET
Filed May 22, 1968    3 Sheets-Sheet 1
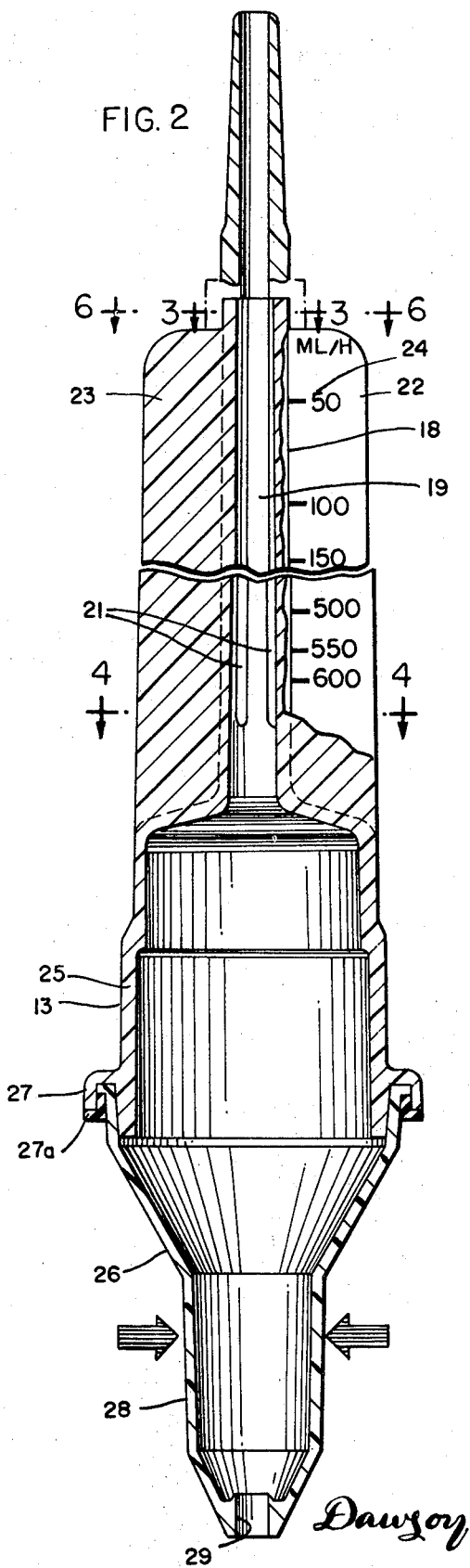
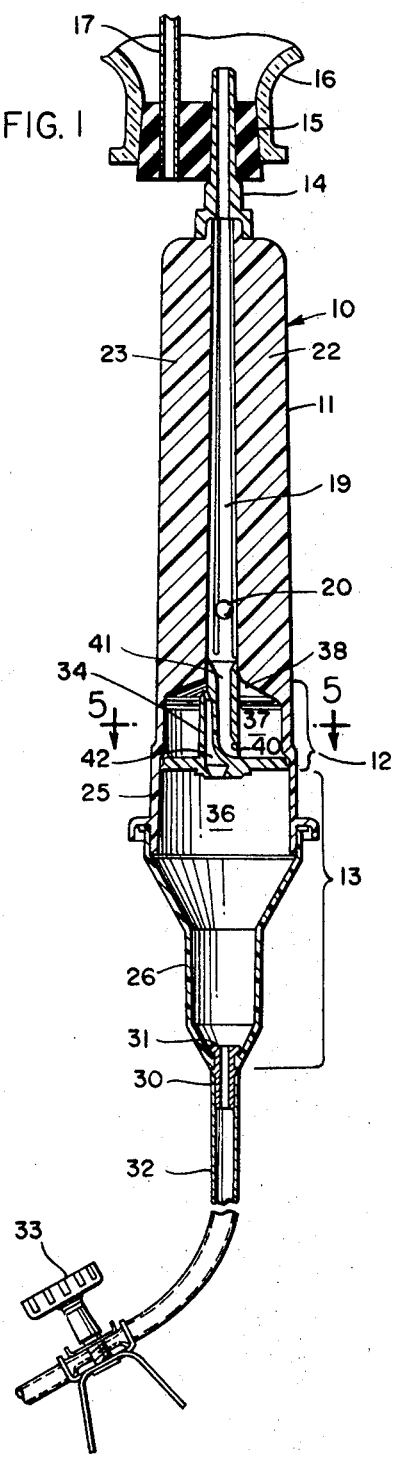
INVENTOR:
WILBUR R. KOEHN
BY
Dawson, Tilton, Fallon & Lungmus
ATT'YS July 28, 1970     W. R. KOEHN     3,521,635
FLOWMETER DE-AERATOR FOR PARENTERAL FLUID ADMINISTRATION SET
Filed May 22, 1968     3 Sheets-Sheet 2
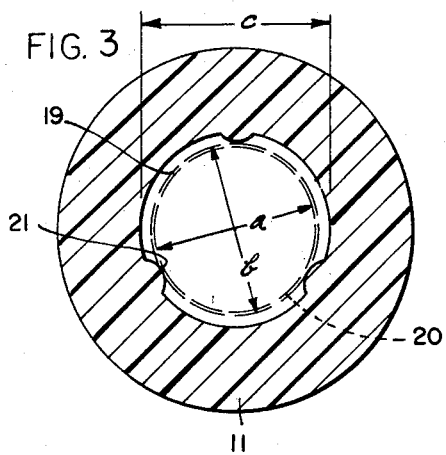
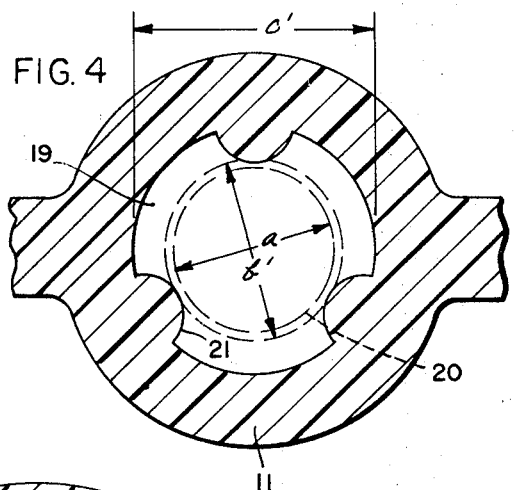
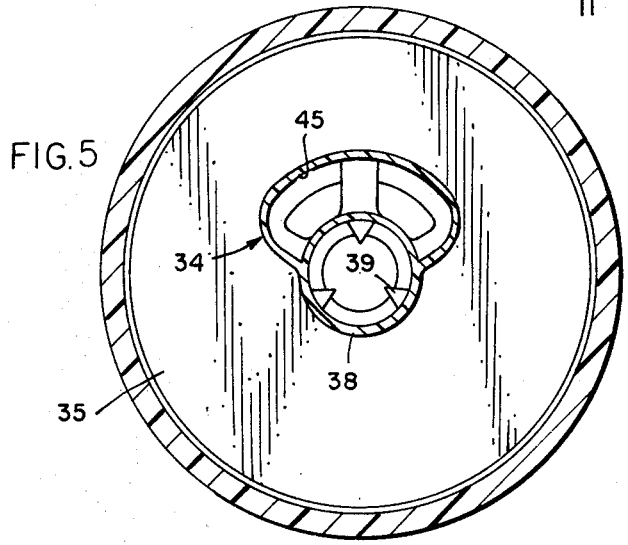
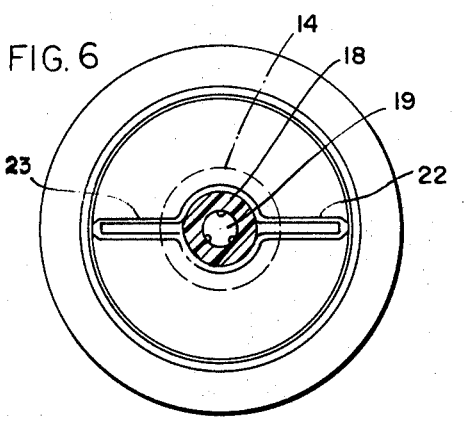
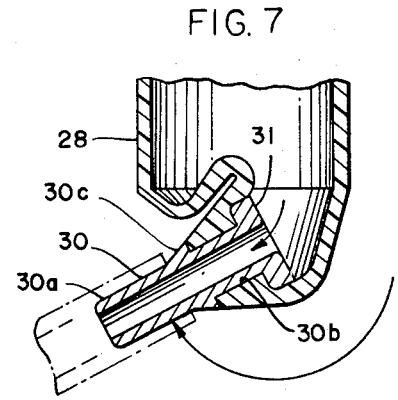
INVENTOR:
WILBUR R. KOEHN
BY
Dawson, Tilton, Fallon & Lungmus
ATT'YS

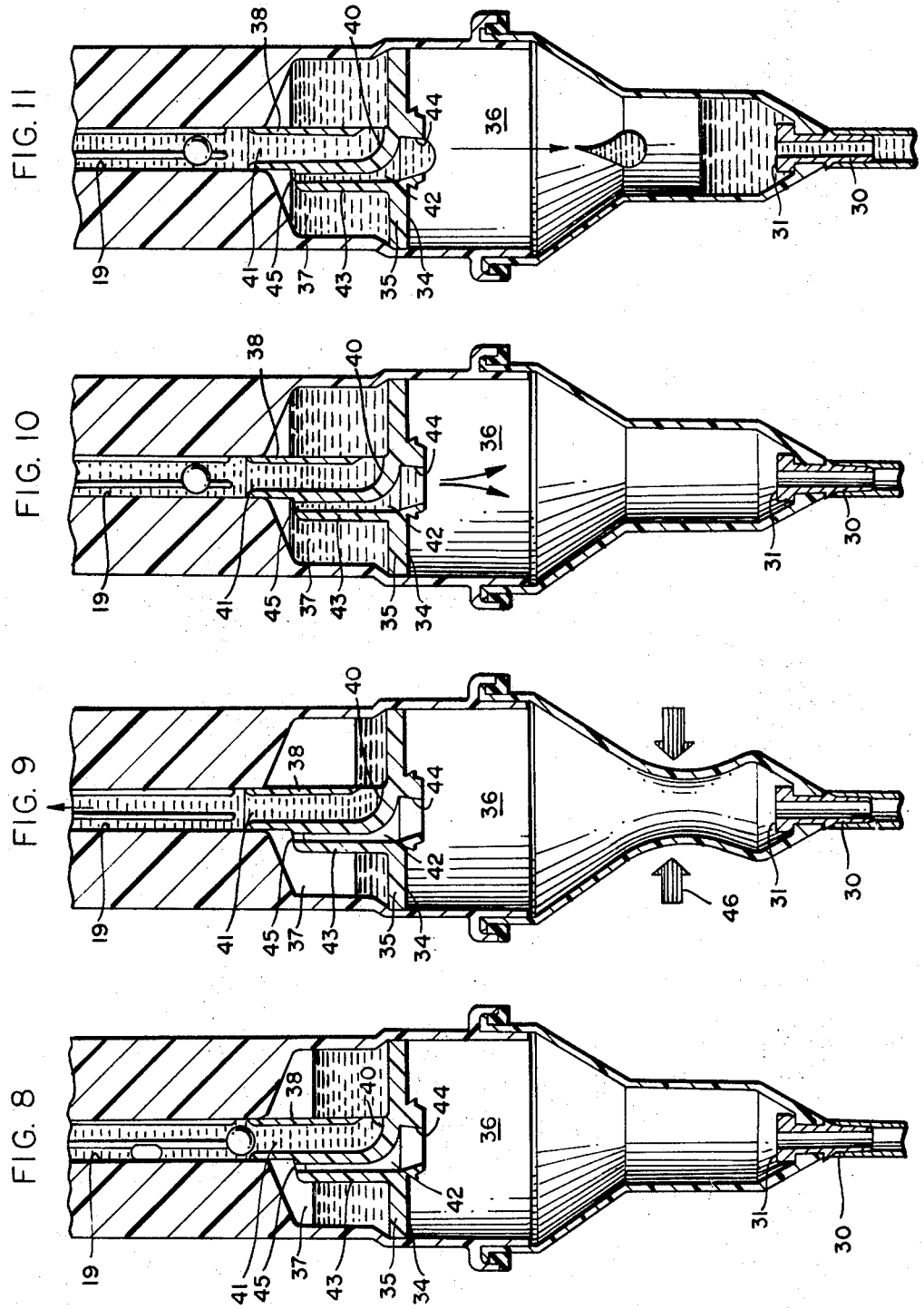

United States Patent Office 3,521,635
Patented July 28, 1970

3,521,635
FLOWMETER DE-AERATOR FOR PARENTERAL FLUID ADMINISTRATION SET
Wilbur R. Koehn, 20 Shorewood Drive,
Port Washington, N.Y. 11050
Filed May 22, 1968, Ser. No. 731,033
Int. Cl. A61m 5/16
U.S. Cl. 128—214                                                13 Claims

ABSTRACT OF THE DISCLOSURE

A flowmeter and drip housing assembly for use in the administration of parenteral fluids wherein a fluid trap is disposed between the flowmeter and drip housing. Manipulation of the flexible wall of the drip housing alternately forces liquid in opposite directions through the flowmeter to flush the float chamber and to propel the float in reversing directions between spaced stops and thereby de-aerate the float and float chamber without at the same time introducing further air into the flowmeter from the drip chamber.

BACKGROUND

Various types of float-equipped flowmeters for use in the administration of parenteral fluids have been known in the past although, in general, each of such meters has been regarded as accurate only for measuring the flow of fluids of given specific gravity and viscosity. An exception is the flowmeter disclosed in Pat. Re. 26,124, issued Dec. 13, 1966, which is capable of accurately indicating on the same graduated scale the flow rates of any of a group of frequently administered parenteral fluids even though such fluids have different specific gravities and viscosities. As brought out in such patent, the relationship between the specific gravities of the float and of the group of fluids to be measured is critical; the float must have a specific gravity correlated to the specific gravities of the liquids of the group to produce a buoyant force on the float in any of such liquids which is substantially equal and opposed to the increased drag force on the float at the same position of the float in the chamber and at the same flow rate of such liquids. In any of such flowmeters, a condition which produces a change in the effective specific gravity of the float will have a significant effect on the accuracy of the device.

SUMMARY

One aspect of the invention lies in recognizing that proper operation of a float-type flowmeter requires the elimination of all air bubbles from the float chamber and that even if bubbles of near-microscopic size should cling to the float of such a flowmeter then the accuracy of the unit as an indicator of flow rates will be significantly impaired. An object, therefore, is to provide means for quickly and easily dislodging air bubbles from the float of a flowmeter, and for removing such bubbles from the float chamber, without at the same time introducing air into the chamber from other parts of the system. Such object has been achieved, as set forth in detail hereinafter, by providing air entrapment means between a flowmeter and a drip housing, and by providing a fluid reservoir above the drip chamber, so that back pressure created by squeezing a flexible wall portion or flasher of the drip housing will result in a reverse surge of liquid, free of any air from the drip chamber or other source, to flush and de-aerate the chamber of the flowmeter and the float element disposed therein. As the flasher is manipulated, the float element is driven forceably against spaced stops to dislodge any minute bubbles which might otherwise cling to the float and impair the accuracy of the flowmeter. The same action which produces a de-aeration of the float chamber and float is also effective in drawing liquid to a desired level into the drip chamber.

THE DRAWINGS

FIG. 1 is a vertical sectional view of an assembly for the administration of parenteral fluids, the flowmeter being shown in an operative position in combination with a solution bottle, a flexible tube leading to a patient, and a suitable clamp for regulating the flow through the tubing;

FIG. 2 is an enlarged elevational view, shown partly in section, of the combined flowmeter and drip housing, the de-aerating unit being omitted for clarity of illustration;

FIG. 3 is an enlarged cross sectional view taken along line 3—3 of FIG. 2;

FIG. 4 is an enlarged cross sectional view taken along line 4—4 of FIG. 2;

FIG. 5 is an enlarged cross sectional view taken along line 5—5 of FIG. 1;

FIG. 6 is an enlarged cross sectional view, on smaller scale than FIG. 3, taken along line 6—6 of FIG. 2;

FIG. 7 is a fragmentary and enlarged vertical sectional view illustrating the interconnection between the flexible wall portion of the drip housing and the tubing of the administration set and showing in particular the relationship of parts when the housing wall is flexed;

FIGS. 8–11 are fragmentary vertical sectional views of the flowmeter and drip chamber assembly showing such assembly at successive stages in a de-bubbling operation in preparation for the administration of a parenteral solution.

DESCRIPTION

Referring to FIG. 1, the numeral 10 generally designates an administration assembly consisting of a unitary flowmeter 11, de-aerator 12, and drip housing 13. A tubular spike portion 14 extending upwardly from the upper end of the flowmeter projects through an aperture in the resilient stopper 15 of an inverted solution bottle 16. Stopper 15 also supports an air tube 17 which extends to the opposite end of the inverted bottle to permit the inflow of air for replacing liquid flowing from the bottle under the influence of gravity. Since the bottle, stopper, and air tube are all entirely conventional and are well known in the art, a further description is believed unnecessary herein.

Flowmeter 11 is similar in construction and operation to the meter disclosed in the aforementioned Pat. Re. 26,124. It consists essentially of a tubular body 18 formed of transparent polystyrene or any other suitable transparent material and having a vertically-extending passage or float chamber 19 extending therethrough. In the illustration given, the chamber is tapered with its diameter increasing gradually in a downward direction. A float 20 is disposed within the float chamber 19 and has a specific gravity which adapts it to move to the same equilibrium position in the chamber in liquids having different specific gravities but flowing at the same rate. The float chamber is provided with circumferentially-spaced ribs or flutes 21 (FIGS. 2–5) to permit the flow of liquid about the float and between the flutes and to prevent the float from sticking to the wall of the chamber when the unit is tipped slightly. Such ribs also perform the important functions of maintaining the float in the middle portion of the flow stream even when the flowmeter is tipped, thereby assuring measuring accuracy, and of preventing the float from lodging against the side of the chamber and from thereby entrapping air bubbles in a zone of lower flow velocity. The relationship between the spherical float and float chamber is indicated in FIGS. 3 and 4 where dimensions c and c' represent the diameters of the float chamber at the levels of the respective sections, dimension a is the diameter of the float 20, and dimensions b and b' represent the diameters of inscribed circles defined by the inner limits of ribs 21 at the respective elevations. Hence, the difference between dimension b (or b') and dimension a represents the slight clearance between the float 20 and the guiding ribs 21.

The structure so far described is essentially the same as disclosed in Pat. Re. 26,124. The relative dimensions of the float chamber and float may be the same as set forth in such patent. As set forth in the patent, the float 20 should have a specific gravity which is so correlated to the specific gravities of the fluids to be measured that the increase in buoyancy of the float in the fluid of higher specific gravity will be equal and opposite to the increased drag force caused by the fluid of higher specific gravity. For parenteral fluids including 1% to 20% dextrose solutions and normal salt solutions, it has been found that a float having a specific gravity of 0.905 will accurately indicate the flow rate of the different liquids within the entire range of flow rates used in injection apparatus. It is to be understood, however, that for other groups of fluids having different ranges of specific gravities and viscosities, as for example bloods of different specific gravities, floats of other specific gravities would be required.

Flowmeter 11 includes a pair of diametrically disposed and radially projecting wing portions 22 and 23 which reinforce the tubular member 18 and which provide surfaces upon which suitable indicia markings 24 may be applied to indicate the flow rates of fluids (preferably measured in milliliters per hour) through the float chamber at the various levels assumed by the float 20 during operation of the flowmeter.

The drip housing 13 is defined in part by an enlarged downwardly projecting cylindrical extension 25 of the same tubular member 18 which defines the float chamber thereabove. Extension 25 defines the upper side wall section of the drip housing 13, the lower section of that housing being defined by a tubular body 26 of elastomeric material. Since the upper section 25 is formed integrally with the flowmeter, it has the same properties of transparency and rigidity as the portion of member 18 which defines the float chamber. The resilient lower section 26 is also preferably formed of transparent or semi-transparent material although, if desired, an opaque material may be used. Ethylene vinyl acetate has been found particularly effective as the fabricating material for lower section 26 but other materials having similar properties of flexibility, resiliency, and preferably transparency or translucency, may be used.

It will be observed that the upper wall section 25 of the drip housing is provided with a circumferential shoulder 27 adjacent the lower end thereof. The lower section 26 extends about the lower end of the upper section and is sealingly fixed to the rigid upper section, and to shoulder 27, by an attachment ring 27a which may be secured in place by heat sealing, cementing, or by any other suitable means. Directly below the rigid upper section, lower section 26 tapers inwardly and then continues downwardly to define a lower well portion or flasher 28 of reduced cross sectional dimensions. At its lower end the well portion is of conical configuration, terminating in an axially-extending opening 29. A rigid tubular insert 30 extends through opening 29 and has an enlarged head 31 disposed within the frusto-conical lower end of the flasher. The lower shank portion 30a of the insert projects downwardly beyond the flasher and is received in the end of a flexible administration tube 32. The parts are effectively sealed together by inserting the insert 30 into the opening of the flasher until the portion of the flasher about opening 29 seats within annular recess 30b between head 31 and shoulder 30c and then fitting tubing 32 over shank portion 30a and sealing the tubing to the insert by electronic sealing, heat sealing, cementing, or by any other appropriate means.

The enlarged annular head 31 within the frusto-conical end of well portion or flasher 28 also performs the important function of maintaining a spaced relation between the opening of the insert and the conical inside surface of the flasher even when the flasher is subjected to distorting forces as, for example, where insert 30 is forced out of axial alignment with the flasher (FIG. 7).

Tubing 32 extends from the flasher portion of the drip housing to a conventional injection device such as a hypodermic needle (not shown). A clamp 33 extends about tube 32 for constricting the tube and thereby selectively controlling the rate of flow therethrough. FIG. 1 illustrates a preferred clamp of a construction disclosed more fully in co-pending application Ser. No. 768,743, filed Oct. 18, 1968, but it is to be understood that other types of clamps might be used.

Referring to FIGS. 1, 5, and 8–11, it will be observed that a de-aerating member 34 is secured within the downwardly facing lower cavity of member 18, the de-aerating member including a transverse partition 35 which defines the upper limits for the drip chamber 36. The partition also defines the lower limits of an intermediate or de-aerating chamber 37 interposed between the drip chamber 36 and float chamber 19. The de-aerating member includes an upstanding tubular neck or stem 38 which extends into the lower end of the float chamber and may, if desired, be secured to the wall of that chamber. At its extreme upper end, the tubular neck is provided with inwardly facing ears or lugs 39 (FIG. 5) which serve as stops to limit the extent of downward movement of float 20 without blocking the flow of fluid about the float should it rest upon the stops in its lowermost position. The extent of upward movement of the float is limited by spike element 14 which has an internal diameter at its lower end slightly smaller than float 20, the lower end of the spike thereby constituting an upper stop for the float.

The stem or neck portion 38 of the de-aerating member 34 defines a passage which extends from the lower end of the float chamber 19 to the bottom of intermediate chamber 37. An opening 40 in the lower portion of the stem adjacent the upper surface of partition 35 places the intermediate chamber 37 in direct communication with the passage 41 of the stem.

A second passage 42 extends through the stem portion alongside passage 41 and is defined in part by wall portion 43 of the stem. As shown most clearly in FIGS. 1 and 8, the second passage 42 extends through partition 35, terminating at its lower end in a drop-forming opening 44 which is centrally disposed in partition 35. The upper end of passage 42 terminates in an arcuate mouth 45 (FIG. 5) in the upper portion of the intermediate chamber at a point spaced well above opening 40 and slightly below the upper limits of that chamber.

The height of opening or mouth 45 above partition 35 (which constitutes the bottom wall of the intermediate chamber) determines the liquid-carrying capacity of the intermediate chamber. When the liquid level in the intermediate chamber exceeds the elevation of opening 45, such liquid will drain into the passage 42 and flow into drip chamber 36. For reasons which will become more apparent hereinafter, it is important that the liquid-carrying capacity of the intermediate chamber substantially exceed the volume of the float chamber thereabove. It is also important that the volumetric capacity of the resilient well portion 28 of the drip housing, specifically the portion of reduced diameter below the frusto-conical portion which connects to rigid section 25, be less than the normal liquid-carrying capacity of intermediate chamber 37.

FIG. 8 illustrates the assembly in a first stage of preparation for operation. The spike of the flowmeter has been plugged into an inverted solution bottle in the manner indicated in FIG. 1 and liquid from the bottle has flowed downwardly into the float chamber 19 and the intermediate chamber 37. The operator then adjusts clamp 33 to close tubing 32 and squeezes the well or flasher portion of the drip housing in the manner indicated by arrows 46 in FIG. 9 to force air from the drip chamber 36 through pasage 42 and into the upper portion of intermediate chamber 37. Liquid in the intermediate chamber is driven back into the float chamber, forcing the float upwardly against its upper stops. It is to be noted that the liquid forced from the intermediate chamber back into the float chamber is bubble-free, having been de-aerated in the intermediate chamber. Since the liquid-carrying capacity of the intermediate chamber is greater than the volume of the generally cylindrical well portion or flasher, the squeezing action applied to the flasher does not lower the liquid in the intermediate chamber to a level below opening 40 and, consequently, air squeezed from the drip chamber is insufficient in volume to lower the liquid volume in the intermediate chamber to a point where air flows directly into the float chamber.

The forceful upward surge of bubble-free liquid through the float chamber flushes that chamber free of bubbles which tend to cling to the chamber walls and to the float. Minute air bubbles which tend to form on the float are forceably removed by the surging liquid and by the sharp impact of the ball against the upper stops (when the flasher is squeezed) and against the lower stops (when the flasher is released). Bubble-free liquid drawn from the body through the float chamber as the flasher is released surges into the intermediate or de-aerating chamber and flows into the secondary passage 42 to flow downwardly into the drip housing (FIG. 10). By successively squeezing and releasing the flasher, the float chamber and float are not only completely de-aerated, but the lower portion of the drip chamber becomes filled with liquid. When the liquid in the drip chamber has substantially filled the resilient flasher portion, the operator releases or partially releases clamp 33 until tube 32 is filled with liquid and all air bubbles have been flushed therefrom. The hypodermic needle (not shown) at the free end of tube 32 is then inserted into the patient and administration of the liquid proceeds with the liquid levels in the respective chambers substantially as shown in FIG. 11. Clamp 33 is adjusted until the desired rate of flow is indicated by the level of float 20 along scale 24.

While in the foregoing I have disclosed an embodiment of the invention in considerable detail for purposes of illustration, it will be understood by those skilled in the art that many of these details may be varied without departing from the spirit and scope of the invention.

I claim:

1. An administration set for parenteral fluids including a flowmeter having a float chamber and a flow rate indicating element movable longitudinally therein between stops, and a drip housing down stream from said flowmeter defining a drip chamber and having a flexible wall portion for manually varying the volume of said drip chamber, in which there is the improvement comprising means defining an intermediate chamber interposed between said flowmeter and said drip chamber, a first passage-providing means extending between said flowmeter and a lower portion of said intermediate chamber for flow communication therebetween, a second passage-providing means extending between an upper portion of said intermediate chamber and said drip chamber for flow communication therebetween, the liquid-carrying capacity of said intermediate chamber substantially exceeding the total volume of the chamber of said flowmeter, whereby, upon inward flexure of said flexible wall portion to force air from said drip chamber towards said intermediate chamber, liquid in the lower portion of said intermediate chamber is forced into said flowmeter to flush out air bubbles disposed therein.

2. The structure of claim 1 in which said drip housing has an upper section and a lower section, said lower section being formed of flexible material and defining the volumetric capacity of said lower well portion being less than the liquid-carrying capacity of said intermediate chamber.

3. The structure of claim 2 in which said upper section of said drip housing is formed of transparent plastic material and said lower section of flexible material is joined to said upper section.

4. The structure of claim 2 in which well portion of said lower section has cross sectional dimensions substantially smaller than said upper section.

5. The structure of claim 3 in which said tubular lower section is formed from substantially transparent plastic material.

6. The structure of claim 5 in which said plastic material is ethylene vinyl acetate.

7. The structure of claim 1 in which said drip housing has a lower well portion formed of resilient flexible material, said well portion having a downwardly tapered frusto-conical end wall defining an opening at the lower end thereof, a flexible tube connected to said well portion and communicating with said drip chamber through said opening, and a rigid tubular insert extending through said tube adjacent said well portion and having an enlarged head disposed within said well portion and having a diameter substantially greater than said opening, whereby, said head comprises a spacer for preventing occlusion of the passage through said tubular insert when the wall of said well portion is flexed.

8. The structure of claim 7 in which the outer surface of said tubular insert is sealingly secured to said flexible tube, said lower end of said well portion being compressed between said enlarged head and said flexible tube to provide a fluid-tight coupling between the parts.

9. The structure of claim 1 in which the means defining said intermediate chamber comprises an upward extension of said drip housing, a transverse partition separating said intermediate chamber and said drip chamber and having a centrally-disposed aperture therethrough, said second passage-providing means comprising a wall within said intermediate chamber extending upwardly from said transverse portion and defining a passage communicating at its lower end with said aperture and terminating at its upper end in an opening located in the upper portion of said intermediate chamber.

10. The structure of claim 9 in which said first passage-providing means comprises a tubular neck portion within said intermediate chamber defining a generally vertical passage therein, said neck portion having an opening disposed in the lower portion of said intermediate chamber adjacent said partition and terminating at its upper end in an opening disposed within and communicating directly with said flow chamber.

11. The structure of claim 10 in which said neck portion provides stop means within said flow chamber for limiting the extent of downward travel of said flow rate indicating element.

12. An assembly for use in the administration of parenteral fluids comprising a tubular body having a vertically-elongated upper float chamber, an intermediate de-aerating chamber, and a variable-volume lower drip chamber; a float disposed within said upper float chamber for vertical movement therein; stop means in the upper and lower portions of said float chamber for limiting the extent of vertical travel of said float; a first passage-providing means extending between said float chamber and the lower portion of said intermediate chamber for flow communication therebetween; and a second passage-providing means extending between an upper portion of said intermediate chamber and said drip chamber for flow communication therebetween; the liquid-carrying capacity of said intermediate chamber substantially exceeding the volume of said float chamber.

13. The structure of claim 12 in which portions of said body defining side wall portions of said float, intermediate, and drip chambers are formed from transparent plastic material.

References Cited

UNITED STATES PATENTS

| | | | |
|---|---|---|---|
| Re. 26,124 | 12/1966 | Koehn | 128—214 |
| 2,704,544 | 3/1955 | Ryan | 128—214 X |
| 2,989,052 | 6/1961 | Broman | 128—214 |
| 3,034,504 | 5/1962 | Winsor et al. | 128—214.2 |
| 3,049,918 | 8/1962 | Sparruhl | 73—209 |

DALTON L. TRULUCK, Primary Examiner

U.S. Cl. X.R.

73—194